(12) United States Patent
Cailleaux et al.

(10) Patent No.: US 11,358,368 B2
(45) Date of Patent: Jun. 14, 2022

(54) CONTAINER WITH IMPROVED RECLOSABLE COVER MEMBER

(71) Applicant: PHILIP MORRIS PRODUCTS S.A., Neuchatel (CH)

(72) Inventors: Timothee Cailleaux, Divonne-les-Bains (FR); Marion Birgit Simone Kamphoff, Berlin (DE); Peter Nimpsch, Berlin (DE)

(73) Assignee: Philip Morris Products S.A., Neuchatel (CH)

( * ) Notice: Subject to any disclaimer, the term of this patent is extended or adjusted under 35 U.S.C. 154(b) by 274 days.

(21) Appl. No.: 16/349,009

(22) PCT Filed: Nov. 13, 2017

(86) PCT No.: PCT/EP2017/079051
§ 371 (c)(1),
(2) Date: May 10, 2019

(87) PCT Pub. No.: WO2018/091408
PCT Pub. Date: May 24, 2018

(65) Prior Publication Data
US 2019/0263556 A1    Aug. 29, 2019

(30) Foreign Application Priority Data
Nov. 18, 2016    (EP) .................................... 16199692

(51) Int. Cl.
*B32B 7/12*    (2006.01)
*B65D 5/66*    (2006.01)
(Continued)

(52) U.S. Cl.
CPC ................ *B32B 7/12* (2013.01); *B32B 3/266* (2013.01); *B32B 7/04* (2013.01); *B32B 7/05* (2019.01);
(Continued)

(58) Field of Classification Search
CPC .............. B65D 85/10568; B65D 5/662; B65D 85/1082; B65D 51/10; B65D 85/1045
(Continued)

(56) References Cited

U.S. PATENT DOCUMENTS 4,233,195 A * 11/1980 Mills ...................... C09D 11/03
106/31.66
7,827,769 B2 * 11/2010 Bertuzzi ............ B65D 85/1027
53/466
(Continued)

FOREIGN PATENT DOCUMENTS

CA          2583933        4/2006
CN      201597921 U       10/2010
(Continued)

OTHER PUBLICATIONS

Office Action issued in China for Application No. 201780066059.2 dated Jan. 5, 2021 (18 pages). English translation included.
(Continued)

*Primary Examiner* — Ernesto A Grano
(74) *Attorney, Agent, or Firm* — Mueting Raasch Group (57) ABSTRACT

A container (10) for consumer goods comprising: an outer housing (12) comprising a box (14) and a lid (16), the lid (16) being hinged to the box (14) along a hinge line extending across a back wall of the outer housing (12); and a package (18) of consumer goods within the box (14). A reclosable sealing cover member(100) occludes an access opening (20) in the package. The reclosable sealing cover member (100) comprises: a base layer (102) comprising a fibrous cellulosic material; a metal-containing layer (104) provided on an outer side of the base layer (102); and a first polymeric layer (106) provided on an inner side of the base layer (102).

15 Claims, 3 Drawing Sheets

(51) Int. Cl.
  *B32B 7/14*   (2006.01)
  *B32B 3/26*   (2006.01)
  *B32B 7/05*   (2019.01)
  *B32B 27/32*  (2006.01)
  *B32B 27/10*  (2006.01)
  *B32B 7/06*   (2019.01)
  *B32B 7/04*   (2019.01)
  *B32B 27/12*  (2006.01)
  *B65D 85/10*  (2006.01)
  *B32B 27/30*  (2006.01)

(52) U.S. Cl.
  CPC .............. *B32B 7/06* (2013.01); *B32B 7/14* (2013.01); *B32B 27/10* (2013.01); *B32B 27/12* (2013.01); *B32B 27/32* (2013.01); *B65D 5/662* (2013.01); *B65D 85/10568* (2020.05); *B32B 27/308* (2013.01); *B32B 2255/10* (2013.01); *B32B 2255/12* (2013.01); *B32B 2255/205* (2013.01); *B32B 2255/24* (2013.01); *B32B 2255/26* (2013.01); *B32B 2255/28* (2013.01); *B32B 2307/718* (2013.01); *B32B 2307/7163* (2013.01); *B32B 2435/02* (2013.01); *B32B 2439/62* (2013.01); *B65D 2575/586* (2013.01)

(58) Field of Classification Search
  USPC ........................................ 206/268, 213, 256
  See application file for complete search history.

(56) References Cited

U.S. PATENT DOCUMENTS

| | | | | |
|---|---|---|---|---|
| 8,091,703 | B2* | 1/2012 | Marchetti | B65D 5/606 |
| | | | | 206/268 |
| 8,590,701 | B2 | 11/2013 | Bertuzzi | |
| 10,266,336 | B2* | 4/2019 | Bray | B65D 85/10568 |
| 10,815,048 | B2* | 10/2020 | Bray | B65B 61/06 |
| 10,894,658 | B2* | 1/2021 | Bellamah | B65D 65/40 |
| 2006/0231431 | A1* | 10/2006 | Tambo | B65D 5/5485 |
| | | | | 206/268 |
| 2007/0193896 | A1 | 8/2007 | Tanbo | |
| 2010/0163563 | A1 | 7/2010 | Lutzig | |
| 2010/0252462 | A1* | 10/2010 | Marchetti | B65D 85/10568 |
| | | | | 206/268 |
| 2012/0006823 | A1* | 1/2012 | Bertuzzi | B65D 85/1027 |
| | | | | 220/270 |
| 2013/0292279 | A1 | 11/2013 | Bengtsson | |
| 2014/0110286 | A1* | 4/2014 | Bertuzzi | B65D 85/10568 |
| | | | | 206/268 |
| 2014/0374290 | A1* | 12/2014 | Seyfferth De Oliveira | |
| | | | | B65D 5/60 |
| | | | | 206/268 |
| 2015/0021219 | A1* | 1/2015 | Seyfferth De Oliveira | |
| | | | | B65D 85/10568 |
| | | | | 206/268 |
| 2015/0034509 | A1* | 2/2015 | Seyfferth De Oliveira | |
| | | | | B65D 85/10568 |
| | | | | 206/268 |
| 2015/0041346 | A1* | 2/2015 | Seyfferth De Oliveira | |
| | | | | B65D 85/10568 |
| | | | | 206/268 |
| 2015/0320111 | A1* | 11/2015 | Slooff | B65D 85/10568 |
| | | | | 206/242 |
| 2015/0321831 | A1 | 11/2015 | Ghini | |
| 2016/0332802 | A1* | 11/2016 | D'Alfonso | B65D 85/1054 |
| 2017/0001790 | A1* | 1/2017 | Kahawaiolaa | B65D 75/5838 |
| 2017/0203910 | A1* | 7/2017 | Buse | B65D 85/10568 |
| 2017/0275082 | A1* | 9/2017 | Krasiev | B65D 85/10568 |
| 2017/0327303 | A1* | 11/2017 | Krasiev | B65D 75/04 |
| 2019/0193925 | A1* | 6/2019 | Bray | B65B 19/22 |
| 2019/0300272 | A1* | 10/2019 | Bray | B65B 19/22 |

FOREIGN PATENT DOCUMENTS

| | | |
|---|---|---|
| CN | 103496504 A | 1/2014 |
| EP | 1803662 | 7/2007 |
| EP | 2471725 | 7/2012 |
| EP | 3093138 | 11/2016 |
| IT | 1398237 | 2/2013 |
| JP | 2016505458 | 2/2016 |
| WO | WO 2016/059077 | 4/2016 |
| WO | WO 2016/087819 | 6/2016 |
| WO | WO 2016/180854 | 11/2016 |

OTHER PUBLICATIONS

PCT Search Report and Written Opinion for PCT/EP2017/079051 dated Jan. 22, 2018 (11 pages).

Office Action issued in Japan for Application No. 2019-525775 dated Nov. 2, 2021 (10 pages). English translation included.

* cited by examiner

Figure 1

CONTAINER WITH IMPROVED RECLOSABLE COVER MEMBER

This application is a U.S. National Stage Application of International Application No. PCT/EP2017/079051 filed Nov. 13, 2017, which was published in English on May 24, 2018, as International Publication No. WO 2018/091408 A1. International Application No. PCT/EP2017/079051 claims priority to European Application No. 16199692.1 filed Nov. 18, 2016.

The present invention relates to a container for consumer goods. Containers in accordance with the present invention find particular application as containers for elongate consumer good items, such as smoking articles.

Smoking articles are typically packaged in rigid hinge-lid containers comprising a box and a lid hinged to the box along a hinge line extending across a back wall of the container. The bundle of smoking articles housed in the box is commonly wrapped in a package comprising an inner liner formed from a flexible sheet material.

In one group of containers, the package has an access opening through which consumer goods can be removed and a reclosable sealing cover member occluding the access opening. The reclosable sealing cover member is typically formed of a plastic or metallic laminate.

A need persists in improving container features and functions with a view to enhancing eco-friendliness. In particular, in this regard, it would be desirable to provide a container for consumer goods wherein the content of polymeric materials is reduced in favour of an increased content of degradable or recyclable materials. However, this should ideally not be to the detriment of usability and reliability, and so it would be desirable to provide one such container wherein the mechanical properties of components, such as the reclosable sealing cover member, are preserved or potentially even enhanced.

According to a first aspect of the present invention, there is provided a container for consumer goods comprising: an outer housing comprising a box and a lid, the lid being hinged to the box along a hinge line extending across a back wall of the outer housing; and a package of consumer goods within the box. The package has an access opening through which consumer goods can be removed and comprises a reclosable sealing cover member occluding the access opening. The cover member is movable from a closed position, wherein the cover member overlies at least the access opening, and an open position, wherein the cover member is at least partially lifted away from the outer surface of the package. The reclosable cover member is permanently affixed to an inner surface of the lid, such that upon opening the lid the reclosable cover member is moved from the closed position towards the open position to at least partly reveal the access opening. The reclosable sealing cover member comprises: a base layer comprising a fibrous cellulosic material; a metal-containing layer provided on an outer side of the base layer; and a first polymeric layer provided on an inner side of the base layer.

As used herein, the terms "front", "back", "upper", "lower", "top", "bottom" and "side", refer to the relative positions of portions of containers according to the invention and components thereof when the container is in an upright position with the access opening of the container at the top of the container. When describing containers according to the present invention, these terms are used irrespective of the orientation of the container being described. The back wall of the outer hinge-lid housing is the wall comprising the hinge line.

When describing a container in accordance with the present invention, the term "longitudinal" refers to a direction from bottom to top or vice versa, whereas the term "transverse" refers to a direction perpendicular to the longitudinal direction. For example, a "longitudinal axis of the container" is an axis extending from bottom to top or vice versa.

The term "width" is used to describe the dimension of an element, such as a panel of a blank or a wall of a container as measured in the transverse direction.

The term "panel" is used throughout this specification to refer to a portion of the blank that is used to form a wall in the assembled container. A panel may depend along one or more fold lines from one or more other panels.

The term "fold line" refers to a fold between two adjacent panels. When forming the container, adjacent panels are folded along their common fold line, which may come to define an edge of the container or of a portion of the container.

In the assembled container a "wall" may be formed of one or of several overlying panels. Where there are several overlying panels, these may be attached to each other, for example by means of an adhesive. Further, a wall may be formed from two or more abutting or overlapping panels.

The term "height" is used to describe the dimension of one such element as measured in a direction perpendicular to the width of the element. When describing an element of the blank, reference is generally made to the element in the flat state of the blank.

The term "thickness" is used herein to refer to the minimum distance measured between two opposite surfaces of the sheet blank or of a layer of the sheet blank. In practice, the distance at a given location is measured along a direction locally perpendicular to the opposite surfaces. The "thickness" of layer will generally be substantially constant over the layer (flat profile). However, local variations may be possible where portions of the sheet blank are, for example, embossed, debossed, weakened, and so forth.

The term "inner surface" is used throughout the specification to refer to the surface of a component of the assembled container that is facing towards the interior of the container, for example towards the consumer goods, when the container is in the closed position. The term "outer surface" is used throughout the specification to refer to the surface of a component of the container that is facing towards the exterior of the container. For example, the front wall of the container has an inner surface that is facing the inside of the container and the consumer goods, and an outer surface facing away from the consumer goods. It should be noted that the inside or outside surface is not necessarily equivalent to a certain side of a blank used in the assembly of the container. Depending on how the blank is folded around the consumer goods, areas that are on the same side of the blank can either face towards the inside or the towards the outside of the container.

The term "hinge line" refers to a line about which the lid may be pivoted in order to open the hinge-lid housing. A hinge line may be, for example, a fold line or a score line in the panel forming the back wall of the container.

The term "depending" is used herein to describe a physical connection between two elements of a container in accordance with the invention. In more detail, the term "depending" is used to indicate that there is a material continuity between two elements, such as two walls or panels of a container or blank. This encompasses both cases wherein a wall or panel depends directly from an adjacent wall or panel as well as cases wherein an intermediate wall or panel effectively connects two walls or panels.

By way of example, a side wall or panel may depend directly from an adjacent front wall or panel. In such case, the wall or panel typically depends along a fold line from the adjacent wall. As an alternative, especially in containers having curved or bevelled edges, a side wall or panel may depend indirectly from a front wall or panel. In such case a curved or bevelled edge wall or panel connects the side wall or panel and the front wall or panel. In the case of a bevelled edge, both side wall or panel and front wall or panel may depend from the connecting bevelled edge wall or panel along respective fold lines. This also applies to optional components of containers in accordance with the invention, for example to a reinforcing member provided in the form of an inner frame.

The term "substantially transparent" is used to describe a material which allows at least a significant proportion of incident light to pass through it, so that it is possible to see through the material in the visible spectrum. In the present invention, a substantially transparent layer allows sufficient light to pass through it that the underlying layer (for example, a metal-containing layer or a paper-containing layer) is visible through the substantially transparent layer. The substantially transparent layer material may be completely transparent. Alternatively, the material forming the layer may have a lower level of transparency whilst still transmitting sufficient light that the underlying layer is visible through the substantially transparent layer.

The term "lines of weakness" is used herein to describe a portion of a surface of the package (or the blank from which the package is formed) wherein the structural strength of the material, from which the package (or blank) is formed has been weakened by any suitable technique, for example with respect to bending, folding or tearing along the line of weakness. For example, a line of weakness may be formed as a scoring line, a creasing line, an ablation line, or a perforation line. Lines of weakness can be created by removal of material, by displacement of material, by compression of material, by locally reducing the forces that hold the material together, such as by breaking fibres in a fibrous material, as well as by combinations of all the above. A line of weakness may be straight, curved, segmented or continuous or a combination thereof. In many instances, a line of weakness is used to assist in positioning a fold line in a blank. A line of weakness can also be used to strengthen the material in a direction perpendicular to the line of weakness, for example by compression. Further, a line of weakness can be used for decorative purpose.

The term "scoring line" is used to describe a line formed by partially cutting into the material of the blank. A scoring line may be formed by removing material from the blank (in which case the scoring line forms a groove or trough in the blank). As an alternative, a scoring line may be formed without removing any material from the blank, typically involving a partial sideways displacement and compression of material, caused by a knife with a non-zero thickness penetrating the material. The depth of the scoring line will be less than the thickness of the blank.

The term "creasing line" is used to describe a line formed by displacing a portion of the material vertical to the plane of the blank, forming a groove or trough in the blank. The displacement may involve compression and typically involves the use of a compression tool, such as a roller. Alternatively, or in addition, the material in the creasing line may be displaced so as to at least partially protrude from the opposite side of the blank. Generally, no material is removed when a creasing line is formed.

The term "ablation line" is used to describe a line formed by removing material from a surface of the blank to a predetermined depth by way of ablation (for example, by way of a laser beam or a blade).

The term "perforated line" is used to describe a line or sequence of discrete holes or slots in the blank. The holes may be formed by pushing an object through the blank. This may result in material being removed from the blank, for example by punching. Alternatively, the holes could be created without removing material, and instead simply using the object to push the material outwardly from the centre of the hole. As another alternative, the holes may be formed by way of a laser beam.

The term "fold line" is used to describe any line of a blank about which the blank is folded. The fold line may be defined by a line of weakness to assist with the folding action. Alternatively, a fold can be formed without the presence of a weakening line, depending for example on the pliability of the blank material and other material characteristics.

In contrast to existing containers, the reclosable sealing cover member of the present invention comprises: a base layer comprising a fibrous cellulosic material; a metal-containing layer provided on an outer side of the base layer; and a first polymeric layer provided on an inner side of the base layer. By including a base layer comprising a fibrous cellulosic material the reclosable sealing cover member can have a higher content of degradable materials and recyclable materials compared with reclosable sealing cover members of existing containers. Accordingly, the environmental friendliness of the container is advantageously increased. Furthermore, in embodiments where the first polymeric layer is substantially transparent, such increased environmental friendliness can be more easily perceivable to a consumer, since a substantially transparent polymeric layer can allow for the underlying base layer to be seen.

In the present invention, the inclusion of a base layer comprising a fibrous cellulosic material will affect the elastic properties of the reclosable sealing cover member. In particular, during opening or closing of the lid, the cellulosic fibres can become broken or damaged as the cover member is moved with the lid. This could result in portions of the reclosable sealing cover member retaining or favouring certain states, and thus reduce the overall elastic flexibility of the reclosable sealing cover member. However, by including a first polymeric layer provided on an inner side of the base layer, the present invention can at least partially compensate for any such adverse effects. That is, the first polymeric layer can help to reduce the likelihood of the reclosable sealing cover member losing its overall elastic flexibility during use of the container. Consequently, the cover member can be more effective at repetitively occluding the access opening, thereby helping to better preserve the contents of the container.

In addition, the first polymeric layer can provide a smoother finish compared with the inherent unevenness of the fibrous cellulosic material contained in the base layer. This can advantageously help the reclosable sealing cover member to better adhere to or seal against adjacent components of the package, such as a sheet blank that is folded around the consumer goods. Furthermore, the first polymeric layer can provide a protective barrier for the inner side of the base layer, which helps to prevent fine particles of dust arising from the fibrous material of the base layer from contaminating any manufacturing apparatus used for attaching the reclosable sealing cover member to the remainder of the package.

Additionally, the first polymeric layer may provide a smoother finish compared with the inherent unevenness of the fibrous cellulosic material contained in the base layer, and thereby provide a more suitable surface that can overly, or being adhered to, areas of the package surrounding the access opening. This can help to better occlude pores and channels that may typically be present in the fibrous base layer, and thereby further improve the closure or sealing properties of the reclosable sealing cover member.

Containers according to the invention are easy to manufacture and do not require any substantial modification of the existing packing apparatus. In particular, there is substantially no need to modify the process for attaching the reclosable sealing cover member to the rest of the package or the lid of the container.

The reclosable sealing cover member may consist only of the base layer, the metal-containing layer and the first polymeric layer. Alternatively, the reclosable sealing cover member may comprise one or more additional layers each disposed on the outer side, the inner side, or in between the base layer, the metal-containing layer and the first polymeric layer.

Accordingly, in some preferred embodiments, the reclosable sealing cover member further comprises a second polymeric layer provided between the metal-containing layer and the base layer. The second polymeric layer can help to further improve the elastic flexibility of the reclosable sealing cover member. Preferably, the second polymeric layer is formed of the same material as the first polymeric layer. Preferably, the second polymeric layer has the same thickness as the first polymeric layer.

The second polymeric layer may assist with the manufacturing process for providing the metal-containing layer on the outer side of the base layer. That is, second polymeric layer can provide a smoother finish compared with the inherent unevenness of the fibrous cellulosic material contained in the base layer, and thereby form a more desirable substrate on which the metal-containing layer is provided.

The metal-containing layer may have any suitable form. For example, the metal-containing layer may be in the form of a foil, such as an aluminium foil. Preferably the metal-containing layer comprises a metallic ink, such as a silver ink. This can allow the metal-containing layer to be provided by way of printing, which can be particularly advantageous when the metal containing layer does not extend over the entirety of the reclosable sealing cover member. Furthermore, this can also allow the metal-containing layer to be relatively thin, and thereby improve cost efficiencies. A thinner metal-containing layer may be more elastically flexible than thicker metal-containing layers. This can also help to reduce the likelihood of the reclosable sealing cover member losing its overall elastic flexibility during use of the container. Consequently, the cover member can be more effective at repetitively occluding the access opening, thereby helping to better preserve the contents of the container.

Accordingly, preferably, a thickness of the metal-containing layer is less than about 10 micrometres. More preferably, the thickness of the metal-containing layer is less than about 5 micrometres. In addition, or as an alternative, preferably the thickness of the metal-containing layer is at least about 1 micrometres. More preferably, the thickness of the metal-containing layer is at least about 2 micrometres.

Preferably, a basis weight of the metal-containing layer is at least about 1 grams per square metre. More preferably, the basis weight of the metal-containing layer is at least about 2 grams per square metre. In addition, or as an alternative, the basis weight of the metal-containing layer is preferably less than about 10 grams per square metre. More preferably, the basis weight of the metal-containing layer is less than about 5 grams per square metre. In particularly preferred embodiments, the basis weight of the metal-containing layer is from about 2 grams per square metre to about 6 grams per square metre. A basis weight of the metal-containing layer of about 4 grams per square metre is particularly preferred.

In some preferred embodiments, the metal-containing layer extends over only a first portion of the reclosable sealing cover member. This can be advantageous where it is desirable for one or more portions to not have a metallic appearance. For example, in some embodiments, it may be preferable to provide a registration mark on a portion of the reclosable sealing cover member for manufacturing purposes. In this case, the registration mark may be more identifiable if it is provided on a non-metallic appearing background. As another example, there may be portions of the blank that do not need to appear metallic. For example, the portion of the reclosable sealing cover member that is permanently affixed to an inner surface of the lid, is unlikely to be viewable by a consumer during normal use of the container. Consequently, it may be desirable for this portion of the reclosable sealing cover member to not have a metal-containing layer, since this may help to reduce the environmental impact of the container, without affecting the usability or appearance of the container.

Accordingly, in some preferred embodiments, a second portion of the reclosable sealing cover member is permanently affixed to an inner surface of the lid, and the second portion of the reclosable sealing cover member does not overlap with the first portion of the container that has the metal-containing layer. In such embodiments, preferably the inner surface of the lid has a fluid guide element, and the second portion of the reclosable sealing cover member is permanently affixed to the inner surface of the lid in the area of the fluid guide element. The fluid guide element may be a depression, such as a recess or a cut-out in the container wall. Thus, the fluid guide element may act as a reservoir, which is adapted to receive and guide adhesive therein, and reduces the smearing or traveling of glue out of the fluid guide element. In such embodiments, it may be particularly desirable for the adhesive in the fluid guide element to directly adhere to the base layer in the second portion of the reclosable sealing cover member. This may allow for direct adhesion between fibres in the base layer and fibres in the inner surface of the lid, and thus provide a strong attachment between the inner surface of the lid and the reclosable sealing cover member.

The underside of the reclosable sealing cover member may be provided with an adhesive arrangement. This can be used to at least partially affix at least part of the reclosable sealing cover member to the remainder of the package. Preferably, the adhesive arrangement comprises a resealable adhesive and a permanent adhesive. Preferably, the permanent adhesive affixes the reclosable sealing cover member to the package along a peripheral region at the back edge of the access opening. Preferably, the resealable adhesive is provided substantially around the peripheral region of the remainder of the access opening. This can therefore form a continuous loop of adhesive around the access opening, such that when the lid is in the closed position the adhesive arrangement forms a seal between the reclosable sealing cover member and the underlying inner package.

The adhesive arrangement extends across an adhesive area on the underside of the reclosable sealing cover member. The adhesive area may cover the entire underside of the reclosable sealing cover member. Preferably, the adhesive area covers only a portion of the underside of the reclosable sealing cover member, such that the underside of the reclosable sealing cover member comprises an adhesive free area. The adhesive free area preferably extends across at least part of the second portion of the reclosable sealing cover member which is permanently affixed to an inner surface of the lid. In particularly preferred embodiments, the adhesive free area is greater than the area of the second portion of the reclosable sealing cover member which is permanently affixed to an inner surface of the lid.

In such embodiments, the second portion of the reclosable sealing cover member may be provided with another ink, which is non-metallic. This may be helpful in identifying the portion of the reclosable sealing cover member that is to be permanently affixed to an inner surface of the lid. Alternatively, no ink may be provided second portion of the reclosable sealing cover member. In either case, it may be preferable to include a primer layer in the second portion the reclosable sealing cover member, which either overlays the non-metallic ink (if present), or overlays a portion of the outer side of the base layer that corresponds to the second portion of the reclosable sealing cover member. Accordingly, in some preferred embodiments, a primer layer is provided on the outer side of the base layer and extends over only the second portion of the reclosable sealing cover member. Such a primer layer may be helpful when permanently affixing the second portion the reclosable sealing cover member to the inner surface of the lid.

The metal-containing layer may form at least a portion of the outer surface of the reclosable sealing cover member. However, in some preferred embodiments, the reclosable sealing cover member further comprises a varnish layer provided on an outer side of the metal-containing layer. Such a varnish may help to further improve the appearance of at least a portion of the outer surface of the reclosable sealing cover member.

In some preferred embodiments, the reclosable sealing cover member further comprises a primer layer provided on a portion of an inner side of the first polymeric layer. Such a primer layer may be helpful when using an adhesive to affix the reclosable sealing cover member to the remainder of the package.

Preferably, a thickness of the base layer is at least about 20 micrometres. More preferably, the thickness of the base layer is at least about 25 micrometres. Even more preferably, the thickness of the base layer is at least about 30 micrometres. In addition, or as an alternative, the thickness of the base layer is less than about 80 micrometres. More preferably, the thickness of the base layer is less than about 60 micrometres. Even more preferably, the thickness of the base layer is less than about 40 micrometres. In particularly preferred embodiments, the thickness of the base layer is from about 30 micrometres to about 40 micrometres. A thickness of the base layer of about 31 micrometres is particularly preferred.

Preferably, a basis weight of the base layer is at least about 20 grams per square metre. More preferably, the basis weight of the base layer is at least about 25 grams per square metre. In addition, or as an alternative, the basis weight of the base layer is preferably less than about 50 grams per square metre. More preferably, the basis weight of the base layer is preferably less than about 40 grams per square metre. In particularly preferred embodiments, the basis weight of the base layer is from about 25 grams per square metre to about 35 grams per square metre. A basis weight of the base layer of about 31 grams per square metre is particularly preferred.

In preferred embodiments, the base layer comprises at least 30 percent by weight of the fibrous cellulosic material. More preferably, the base layer comprises at least 50 percent by weight of the fibrous cellulosic material. Even more preferably, the base layer comprises at least 70 percent of the fibrous cellulosic material. In some particularly preferred embodiments, the base layer is substantially entirely formed of the fibrous cellulosic material. By way of example, the base layer may be formed from a sheet of paper. Higher contents of the fibrous cellulosic material make the base layer more easily degradable.

In some preferred embodiments, the reclosable sealing cover member extends beyond the periphery of the access opening; and is at least partly permanently affixed to the package by a permanent adhesive provided on a back hinge area of the inner surface of the reclosable sealing cover member, and at least partly releasably affixed to the package by a resealable adhesive provided on a second area of the inner surface of the reclosable sealing cover member extending at least about a front edge of the access opening.

In some preferred embodiments, the reclosable sealing cover member comprises a top part and a bottom part; the bottom part being affixed to the package by means of a permanent adhesive provided on a first area of the inner surface of the bottom part extending about the periphery of the access opening, the bottom part comprising a cut-out portion at least partly aligned with the access opening of the package; the top part being at least partly permanently affixed to the bottom part by means of a permanent adhesive provided on a back hinge area of the inner surface of the top part, and at least partly releasably affixed to the bottom part by means of a second adhesive provided on a peeling area of the inner surface of the top layer extending distal from the hinge area, such that the top part is movable from a closed position, wherein the top part overlies at least the access opening, and an open position, wherein the top part is lifted off the bottom part to reveal the cut-out portion. Preferably, the top part comprises the base layer, the metal-containing layer, and the first polymeric layer, and the bottom part comprises at least one further layer of material. The at least one further layer of material, may comprise one or more of fibrous cellulosic material, metallic material and polymeric material.

Preferably, the package is formed from a sheet blank, which when folded forms a sealed enclosure for containing the consumer goods. In such embodiments, preferably, the sheet blank comprises: a sheet blank base layer comprising a fibrous cellulosic material; a sheet blank metal-containing layer provided on an outer side of the base layer; and a sheet blank first sealable layer comprising a sealable polyolefin and provided on at least a seal area of an inner side of the base layer. Preferably, such a package is formed by folding the blank such that ends of the blank are brought together so as to overlie to form a wrapping about a group of consumer goods; wherein the seal area extends at least partly over the overlying ends of the blank and the overlying ends of the blank are sealed together.

Any suitable polymeric material may be used for the one or more polymeric layers of the reclosable sealing cover member. Suitable sealable polymeric material for inclusion in either one of the first and second polymeric layers include polyolefin-based and acrylic-based polymers. In some preferred embodiments, the sealable material comprises polyethylene or polypropylene.

The container of the present invention may optionally comprise an outer wrapper, which is preferably a transparent polymeric film of, for example, high or low density polyethylene, polypropylene, oriented polypropylene, polyvinylidene chloride, cellulose film, or combinations thereof and the outer wrapper is applied in a conventional manner. The outer wrapper may include a tear tape. In addition, the outer wrapper may be printed with images, consumer information or other data.

Containers according to the invention find particular application as containers for elongate smoking articles such as, for example, cigarettes, cigars, cigarillos or other aerosol generators that rely on heating rather than burning tobacco, for example through an electrical heat source or carbon heat source. It will be appreciated that through appropriate choices of the dimensions thereof, containers according to the invention may be designed for different numbers of conventional size, king size, super-king size, slim or super-slim cigarettes. Alternatively, other consumer goods may be housed inside the container.

Through an appropriate choice of the dimensions, containers according to the invention may be designed to hold different total numbers of smoking articles, or different arrangements of smoking articles. For example, through an appropriate choice of the dimensions, containers according to the invention may be designed to hold a total of between ten and thirty smoking articles. The smoking articles may be arranged in different collations, depending on the total number of smoking articles.

The invention will now be further described, by way of example only, with reference to the accompanying drawings in which.

Figure 1:
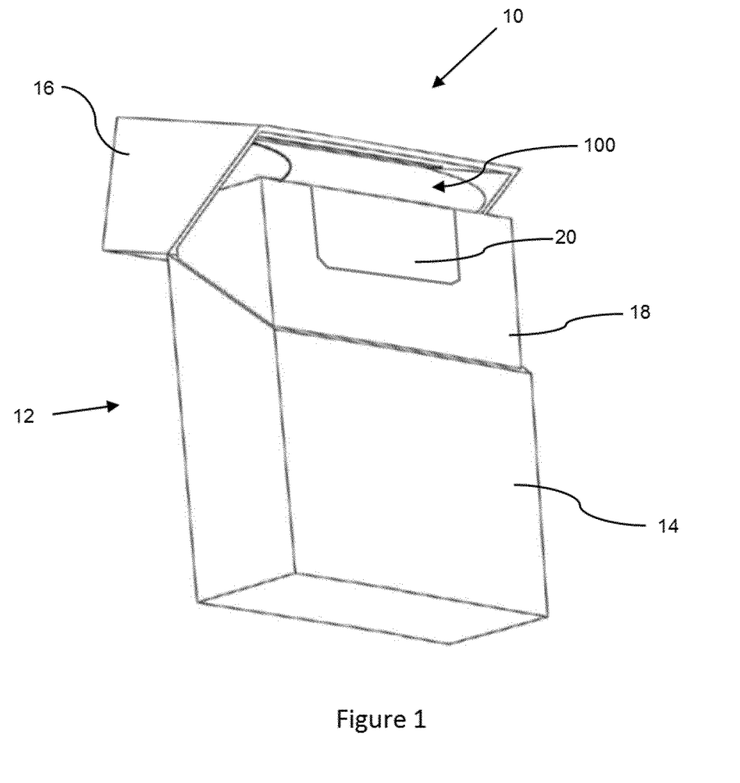
FIG. 1 is a schematic perspective view of an embodiment of a container in accordance with the present invention.

FIG. 1 shows a container 10 in accordance with the present invention. The container 10 comprises an outer housing 12 which is a rectangular parallelepiped and includes a box 14 and a lid 16. The lid 16 is hinged about a hinge line extending across a back wall of the housing 12 and is pivotable between an open position (shown in FIG. 1) and a closed position. Further, the container 10 comprises an inner package 18 containing a group of smoking articles and housed in the box 14.

The package 18 comprises an access opening 20 extending across the top wall and the front wall of the inner package. The smoking articles contained in the inner package 18 can be removed through the access opening when the lid 16 is in the open position. The inner package 18 comprises a reclosable sealable cover member 100 occluding the access opening 20 of the package and extending beyond the periphery of the access opening of the package. The cover member 100 is movable from a closed position, wherein the cover member overlies at least the access opening, and an open position (illustrated in FIG. 1), wherein the cover member 100 is lifted off the outer surface of the package 18. Further, the reclosable cover member 100 is permanently affixed to an inner surface of the lid 16, such that upon opening the lid 16 the reclosable cover member 22 is moved from the closed position towards the open position to at least partly reveal the access opening 20.

In the embodiment of FIG. 1 the reclosable sealing cover member 100 extends beyond the periphery of the access opening 20. The reclosable sealing cover member 100 is at least partly permanently affixed to the package by a permanent adhesive provided on a back hinge area of the inner surface of the reclosable sealing cover member 100. Further the reclosable sealing cover member 100 is at least partly releasably affixed to the package 18 by a resealable adhesive provided on a second area of the inner surface of the reclosable sealing cover member 100 extending at least about a front edge of the access opening 20. The permanent adhesive and resealable adhesive arrangement can be better seen from FIGS. 2 to 4, which are described in more detail below.

Figure 2:
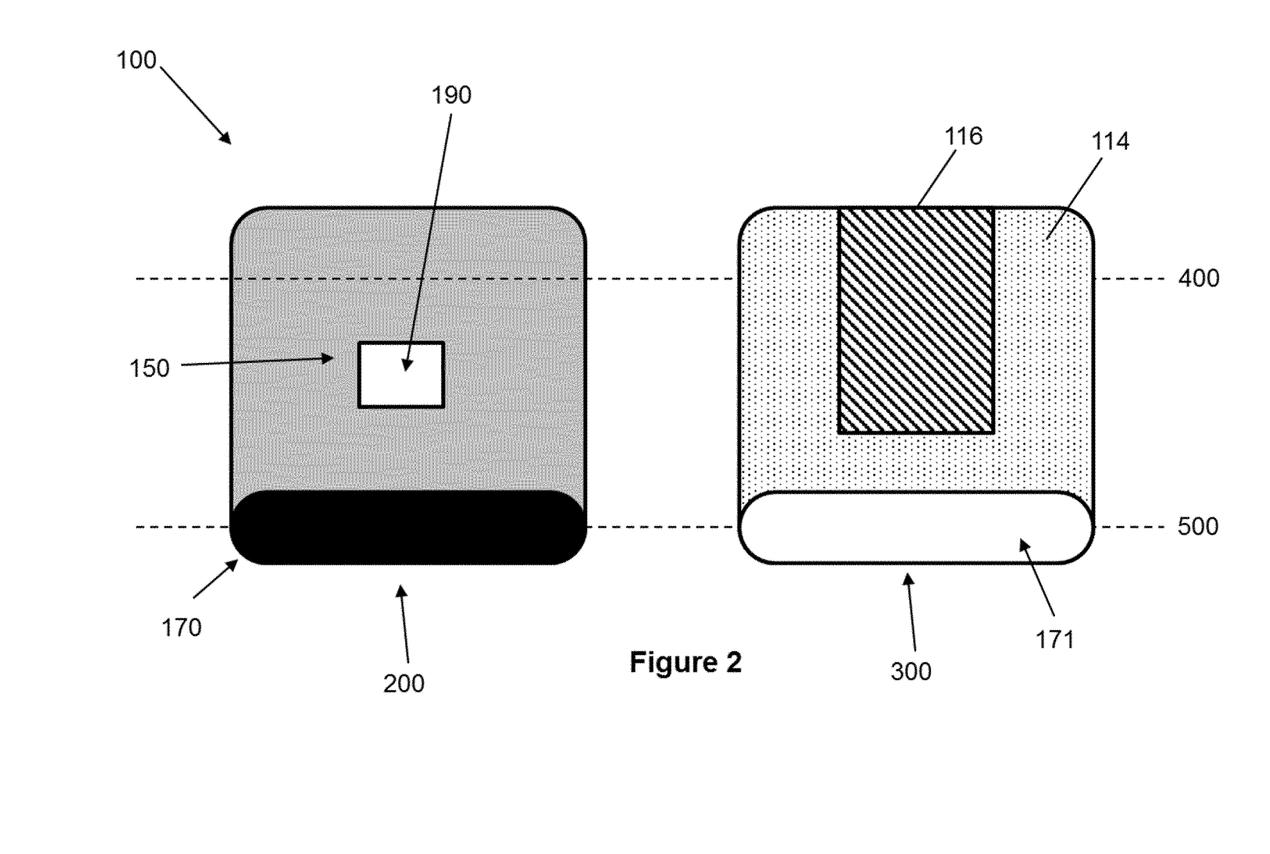
FIG. 2 shows a top view and a bottom view of the reclosable sealable cover member of the container of FIG. 1.
Figure 3:
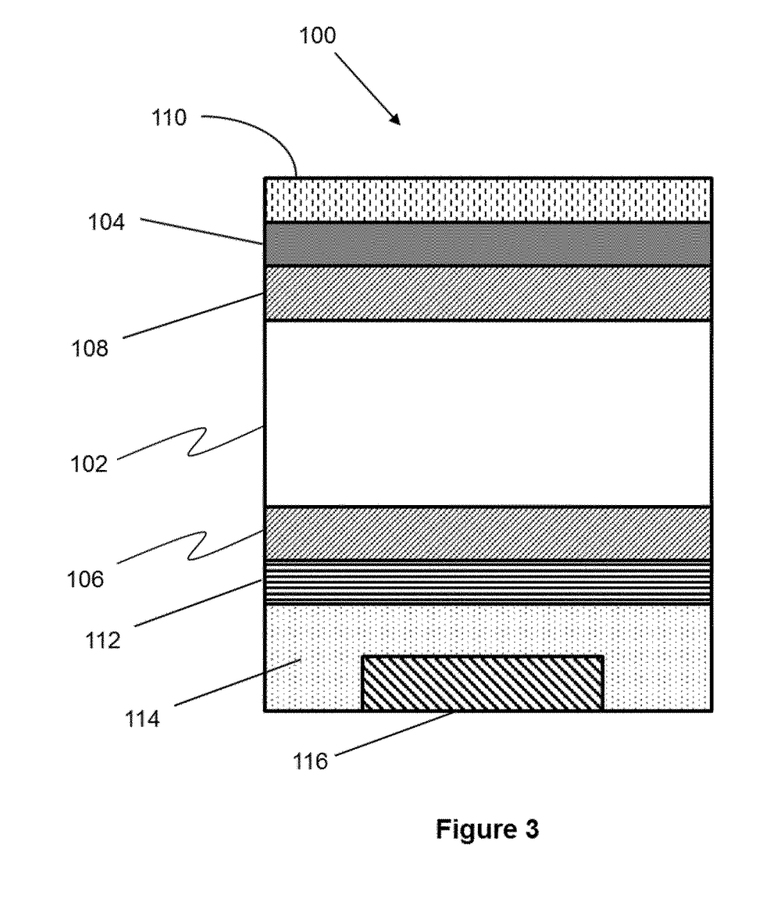
FIG. 3 shows a first cross sectional view of the reclosable sealable cover member of FIG. 2.
Figure 4:
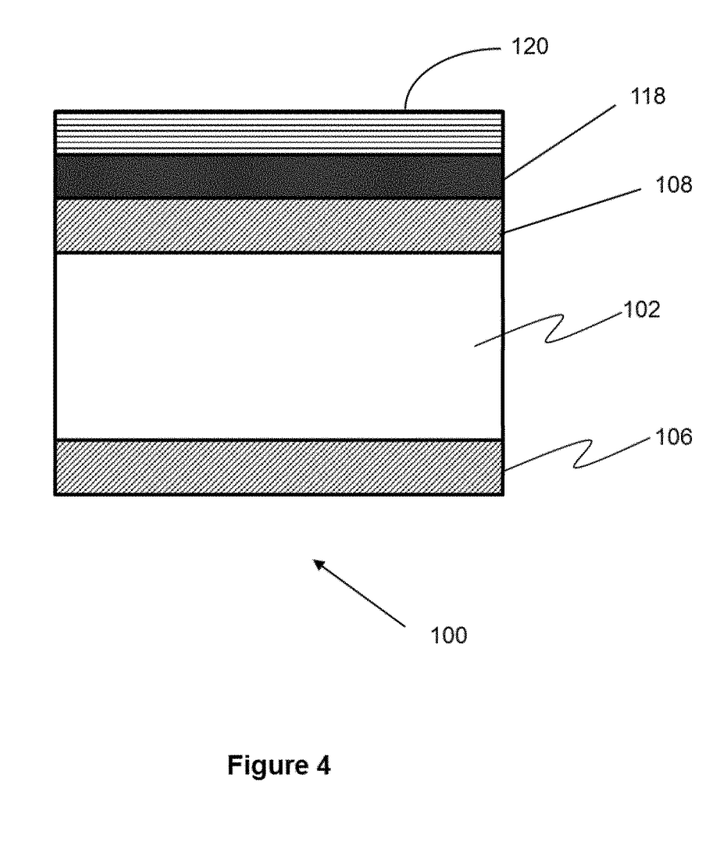
FIG. 4 shows a second cross sectional view of the reclosable sealable cover member of FIG. 2.

FIG. 2 shows a top view 200 and a bottom view 300 of the reclosable sealable cover member 100 of FIG. 1. FIG. 3 shows a first cross sectional view of the reclosable sealable cover member 100 as viewed along cross section 400. FIG. 4 shows a second cross sectional view of the reclosable sealable cover member 100 as viewed along cross section 500.

As can be seen from FIGS. 2 to 4, the reclosable sealing cover member 100 comprises a first portion 150 and a second portion 170.

As can be seen from the cross-sectional view in FIG. 3, in the first portion 150, the reclosable sealing cover member 100 comprises a base layer 102, a metal-containing layer 104 provided on an outer side of the base layer 102, and a first polymeric layer 106 provided on the inner side of the base layer 102. The base layer 102 is a layer of paper, the metal-containing layer 104 is a layer of silver ink, and the first polymeric layer 106 is a layer of polypropylene. A second polymeric layer 108 of polypropylene is provided between the metal-containing layer 104 and the base layer 102. A primer layer 112 is provided in the inner side of the first polymeric layer 106, and a substantially transparent varnish layer 110 is provided is provided on the outer side of the metal-containing layer 104.

The underside of the reclosable sealing cover member 100 is provided with an adhesive arrangement comprising a resealable adhesive 114 and a permanent adhesive 116. The adhesives 114, 116 do not extend across to the second portion 170 of the reclosable sealing cover member 100. Consequently, an adhesive free area 171 can be seen on the underside of the reclosable sealing cover member 100 shown in FIG. 2. Although the adhesive free area 171 in FIG. 2 is shown to only extend across the second portion 170 of the reclosable sealing cover member 100, it will be appreciated that the adhesive free area may extend beyond the second portion 170, for example, by extending into the first portion 150 of the reclosable sealing cover member 100.

As can be seen from FIG. 4, in the second portion 170, the reclosable sealing cover member 100 also comprises the base layer 102, and the first and second polymeric layers 106, 108. The metal-containing layer 104, however, does not extend into the second portion 170, and instead a non-metallic ink layer 118, such as a black ink, is provided on the outer side of the second primer layer 108. A primer layer 120 is additionally provided on the outer side of the non-metallic ink layer 118.

As can be seen from FIG. 2, as a result of the layer arrangements described above, the top view of the reclosable sealing cover member 100 primarily has a glossy metallic appearance in the first portion 150 of the reclosable sealing cover member 100. No metallic appearance is provided in the second portion 170, but this portion is fixed to the lid of the container so will not be easily viewable for a consumer. A spare out portion 190 is also left without a metallic appearance in order to provide a registration mark for manufacturing purposes. However, the metal-containing layer 104 may also extend into this portion 190 if desired. On the underside of the reclosable sealing cover member 100 will also have a substantially paper-like appearance, provided that the first polymeric layer 106, the primer layer 112 and the adhesive layers 114, 116 are substantially transparent.

The invention claimed is:

1. A container for consumer goods comprising:
   an outer housing comprising a box and a lid, the lid being hinged to the box along a hinge line extending across a back wall of the outer housing;
   a package of consumer goods within the box, the package formed from a sheet blank folded around the consumer goods and having an access opening through which consumer goods can be removed; and
   a reclosable sealing cover member adapted to occlude the access opening, the reclosable sealing cover member being separate and distinct from the sheet blank from which the package is formed,
   wherein an underside of the reclosable sealing cover member is provided with an adhesive arrangement to at least partially affix at least part of the reclosable sealing cover member to an outer surface of the package such that the cover member is movable from a closed position,
   wherein the reclosable sealing cover member overlies at least the access opening, and an open position,
   wherein the reclosable sealing cover member is at least partially lifted away from the outer surface of the package; and
   wherein the reclosable cover member is permanently affixed to an inner surface of the lid, such that upon opening the lid the reclosable cover member is moved from the closed position towards the open position to at least partly reveal the access opening;
   wherein the reclosable sealing cover member comprises:
   a base layer comprising a fibrous cellulosic material;
   a metal-containing layer provided on an outer side of the base layer; and
   a first polymeric layer provided on an inner side of the base layer.

2. The container of claim 1, wherein the reclosable sealing cover member further comprises a second polymeric layer provided between the metal-containing layer and the base layer.

3. The container of claim 1, wherein the metal-containing layer comprises a metallic ink.

4. The container of claim 1, wherein the metal-containing layer extends over only a first portion of the reclosable sealing cover member.

5. The container of claim 4, wherein a second portion of the reclosable sealing cover member is permanently affixed to an inner surface of the lid, and wherein the second portion of the reclosable sealing cover member does not overlap with the first portion.

6. The container of claim 5, wherein a first primer layer is provided on the outer side of the base layer and extends over only the second portion of the reclosable sealing cover member.

7. The container of claim 1, wherein the underside of the reclosable sealing cover member comprises an adhesive free area.

8. The container of claim 1, wherein the reclosable sealing cover member further comprises a varnish layer provided on an outer side of the metal-containing layer.

9. The container of claim 1, wherein a basis weight of the base layer is at least about 20 grams per square metre.

10. The container of claim 1, wherein the base layer comprises at least 30 percent by weight of the fibrous cellulosic material.

11. The container of claim 1, wherein the reclosable sealing cover member extends beyond the periphery of the access opening; and is at least partly permanently affixed to the package by a permanent adhesive provided on a back hinge area of the inner surface of the reclosable sealing cover member, and at least partly releasably affixed to the package by a resealable adhesive provided on a second area of the inner surface of the reclosable sealing cover member extending at least about a front edge of the access opening.

12. The container of claim 1, wherein the reclosable sealing cover member comprises a top part and a bottom part; the bottom part being affixed to the package by a permanent adhesive provided on a first area of the inner surface of the bottom part extending about the periphery of the access opening, the bottom part comprising a cut-out portion at least partly aligned with the access opening of the package; the top part being at least partly permanently affixed to the bottom part by a permanent adhesive provided on a back hinge area of the inner surface of the top part, and at least partly releasably affixed to the bottom part by a second adhesive provided on a peeling area of the inner surface of the top layer extending distal from the hinge area, such that the top part is movable from a closed position, wherein the top part overlies at least the access opening, and an open position, wherein the top part is lifted off the bottom part to reveal the cut-out portion.

13. The container of claim 12, wherein the top part comprises the base layer, the metal-containing layer, and the first polymeric layer, and the bottom part comprises at least one further layer of material.

14. The container of claim 1, wherein the package is formed from a sheet blank, which when folded forms a sealed enclosure for containing the consumer goods.

15. The container of claim 14, wherein the package is formed by folding the blank such that ends of the blank are brought together so as to overlie to form a wrapping about a group of consumer goods; wherein the seal area extends at least partly over the overlying ends of the blank and the overlying ends of the blank are sealed together.

* * * * *